United States Patent
Lin

(10) Patent No.: US 11,249,685 B2
(45) Date of Patent: Feb. 15, 2022

(54) METHOD FOR ACCESSING FLASH MEMORY MODULE, ASSOCIATED FLASH MEMORY CONTROLLER AND ELECTRONIC DEVICE FOR ACCELERATING READING SPEED OF FLASH

(71) Applicant: Silicon Motion, Inc., Hsinchu County (TW)

(72) Inventor: Yu-Chih Lin, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 31 days.

(21) Appl. No.: 16/888,863

(22) Filed: Jun. 1, 2020

(65) Prior Publication Data

US 2021/0294524 A1    Sep. 23, 2021

(30) Foreign Application Priority Data

Mar. 20, 2020   (TW) ................. 109109455

(51) Int. Cl.
  *G06F 12/00*   (2006.01)
  *G06F 3/06*    (2006.01)
  *G06F 11/07*   (2006.01)

(52) U.S. Cl.
  CPC .......... *G06F 3/0659* (2013.01); *G06F 3/0604* (2013.01); *G06F 3/0679* (2013.01); *G06F 11/076* (2013.01); *G06F 11/0727* (2013.01)

(58) Field of Classification Search
  None
  See application file for complete search history.

(56) References Cited

U.S. PATENT DOCUMENTS

| 10,102,920 | B2 | 10/2018 | Reusswig |
|---|---|---|---|
| 2014/0047269 | A1* | 2/2014 | Kim .................... G06F 11/1402 714/16 |
| 2017/0168894 | A1* | 6/2017 | Kim ....................... G11C 29/52 |

FOREIGN PATENT DOCUMENTS

| TW | I657568 B | 4/2019 |
|---|---|---|
| TW | 201919048 A | 5/2019 |

* cited by examiner

*Primary Examiner* — Daniel D Tsui
(74) *Attorney, Agent, or Firm* — Winston Hsu

(57) ABSTRACT

The present invention provides a method for accessing a flash memory module, wherein the flash memory module includes at least one flash memory chip, each flash memory chip includes a plurality of blocks, each clock includes a plurality of pages, and the method includes the steps of: providing a read-retry table, wherein the read-retry table includes a plurality of read setting levels, each read setting level corresponds to at least one read voltage, and no two read setting levels have the same read voltage; establishing a read success recording table, which records at least one specific read setting level that was previously used to successfully read the flash memory module; and when it is required to the read the flash memory module, using the at least one specific read setting level recorded in the read success recording table to read the flash memory module.

23 Claims, 6 Drawing Sheets

METHOD FOR ACCESSING FLASH MEMORY MODULE, ASSOCIATED FLASH MEMORY CONTROLLER AND ELECTRONIC DEVICE FOR ACCELERATING READING SPEED OF FLASH

BACKGROUND OF THE INVENTION

1. Field of the Invention

The present invention relates to a flash memory, and more particularly, to a method of an accessing a flash memory module, and associated flash memory controller and electronic device.

2. Description of the Prior Art

With the development of the Low-density parity-check code (LDPC), the Error Correction Code (ECC) circuit in a flash memory controller may perform error correction on the data having a higher bit error quantity/bit error rate, to successfully decode the data. However, although the decoding ability of the ECC circuit has been improved, when the bit error quantity/bit error rate becomes higher than a threshold value, the processing speed of the ECC circuit will drop dramatically, e.g. down to 20 megabyte per second (MB/s), thereby impacting the system efficiency.

In order to solve the aforementioned problem that the bit error quantity/bit error rate is too high which affects the system efficiency or even results in failure in decoding, the flash memory module may provide multiple read-setting levels to use different reading voltages to read the flash memory module, in order to obtain suitable data (i.e. decodable data or the data with lower bit error quantity/bit error rate). The aforementioned read-setting levels might become more and more with the development of the technology, such as 50 read-setting levels, but to read the 50 read-setting levels in a one-by-one manner can be very time-consuming, however. For example, when the flash memory module is operated under a harsh environment (e.g. extremely high or extremely low temperature), the threshold voltages of memory units in the flash memory module will have larger offsets. Hence, it generally requires the flash memory controller to read 40-50 read-setting levels so as to find the suitable data, which mean the time spent on the previous some 40 read-setting levels is totally wasted.

SUMMARY OF THE INVENTION

Hence, an objective of the present invention is to propose a method of an accessing a flash memory module, and associated flash memory controller and electronic device, in order to quickly find a suitable read-setting level, so as to solve the problem faced in related art techniques that huge time is wasted on searching for the suitable read-setting level.

An embodiment of the present invention discloses a flash memory controller. The flash memory controller is arranged to access a flash memory module, the flash memory module comprises at least one flash memory chip. Each of the flash memory chip comprises multiple blocks, each of the blocks comprises multiple pages, and the flash memory controller comprises a read-only memory (ROM), a microprocessor and a buffer memory. The ROM is arranged to store a code. The microprocessor is arranged to execute the code to control accessing of the flash memory module. The buffer memory is arranged to store a read-retry table and a read-success recording table, wherein the read-retry table records multiple read-setting levels, each of the read-setting levels corresponds to at least one reading voltage, and reading voltages of any two read-setting levels among the read-setting levels are not entirely the same; and the read-success recording table records at least one specific read-setting level that has been previously used to successfully read the flash memory module. When the microprocessor needs to read the flash memory module, the microprocessor reads the flash memory module according to the at least one specific read-setting level recorded in the read-success recording table.

Another embodiment of the present invention discloses a method of accessing a flash memory module. The flash memory module comprises at least one flash memory chip, each of flash memory chip comprises multiple blocks, and each of block comprises multiple pages. The method comprises: providing a read-retry table, wherein the read-retry table records multiple read-setting levels, each of read-setting levels corresponds to at least one reading voltage, and reading voltages of any two of the read-setting levels are not entirely the same; establishing a read-success recording table, which records at least one specific read-setting level that has been previously used to successfully read the flash memory module; and when there is a need to read the flash memory module, using the at least one specific read-setting level recorded in the read-success recording table to read the flash memory module.

Another embodiment of the present invention discloses an electronic device that comprises a flash memory module and a flash memory controller. The flash memory controller is arranged to access the flash memory module, wherein the flash memory controller stores a read-retry table, the read-retry table records multiple read-setting levels, each of read-setting levels corresponds to at least one reading voltage, and reading voltages of any two of the read-setting levels are not entirely the same. In the operations of the electronic device, the flash memory controller further establishes a read-success recording table, wherein the read-success recording table records at least one specific read-setting level that has been previously used to successfully read the flash memory module; and when the flash memory controller needs to read the flash memory module, the flash memory controller reads the flash memory module according to the at least one specific read-setting level recorded in the read-success recording table.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
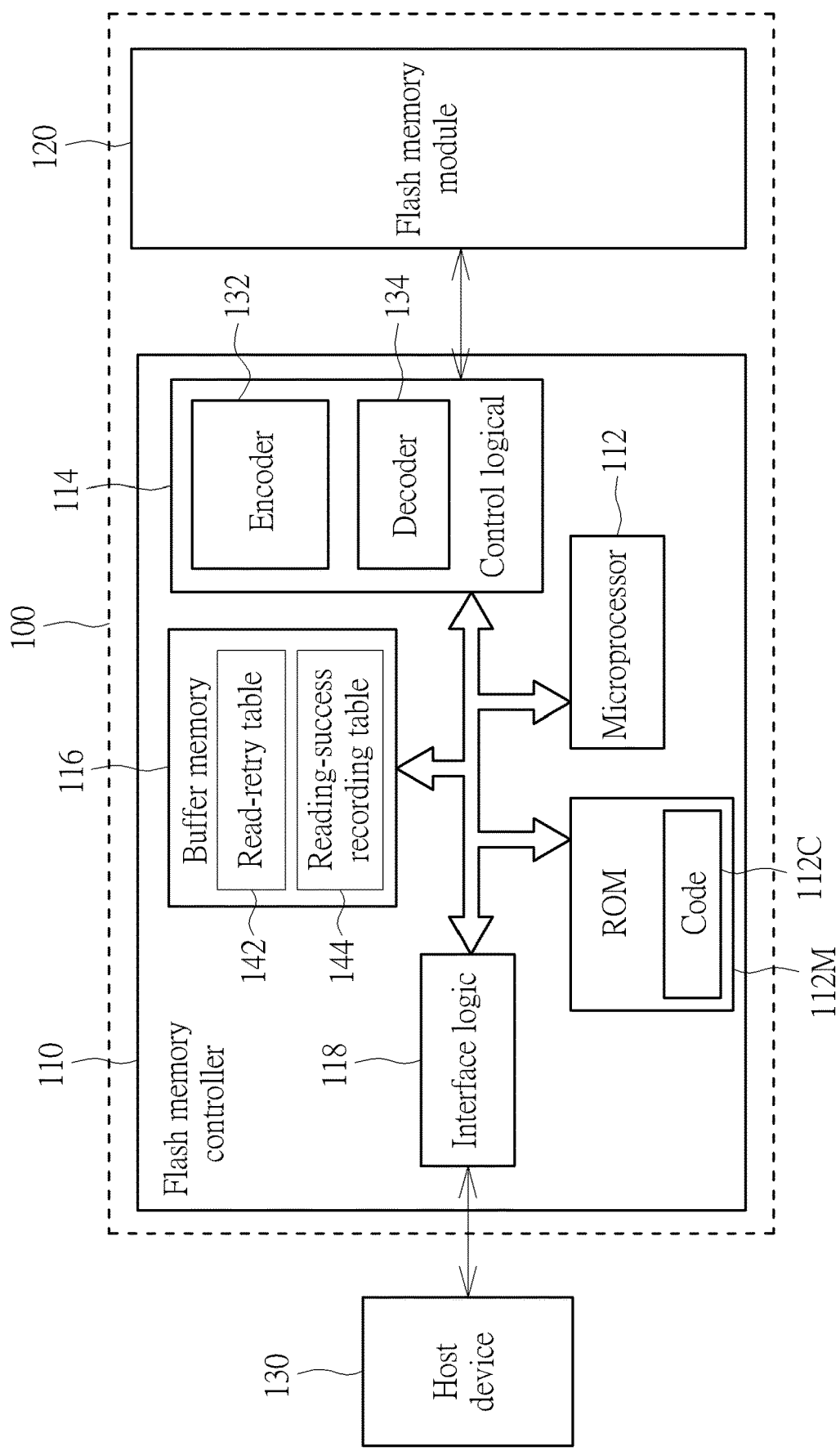
FIG. 1 is a diagram illustrating a memory device according to an embodiment of the present invention.

FIG. 1 is a diagram illustrating a memory device 100 according to an embodiment of the present invention. The memory device 100 comprises a flash memory module 120 and a flash memory controller 110, and the flash memory controller 110 arranged to access the flash memory module 120. According to this embodiment, the flash memory controller 110 comprises a microprocessor 112, a read-only memory (ROM) 112M, a control logical 114, a buffer memory 116 and an interface logic 118. The ROM 112M is arranged to store a code 112C, and the microprocessor 112 is arranged to execute the code 112C to control accessing of the flash memory module 120. The control logical 114 comprises an encoder 132 and a decoder 134, wherein the encoder 132 is arranged to encode data in the flash memory module 120 in order to generate corresponding verification code (also referred to as Error Correction Code, ECC), and the decoder 134 is arranged to decode the data read from the flash memory module 120.

Ina typical situation, the flash memory module 120 may comprise multiple flash memory chips, each of the flash memory chips comprises multiple blocks, and the flash memory controller 110 may use "block" as the unit to perform data erasing operations on the flash memory module 120. Further, a block may record a specific amount of pages, wherein the flash memory controller 110 uses "page" as the unit to perform data writing operations on the flash memory module 120. In this embodiment, the flash memory module 120 is 3D NAND-type flash module.

In practice, the flash memory controller 110 for executing the code 112C via the microprocessor 112 may perform various control operations by utilizing its inner elements, e.g., utilizing the control logical 114 to control accessing of the flash memory module 120 (especially accessing of at least one block or at least one page), utilizing the buffer memory 116 to perform necessary buffering, and utilizing the interface logic 118 to communicate with a host device 130. The buffer memory 116 is implemented with a random access memory (RAM). For example, the buffer memory 116 may be a static random access memory (Static RAM, or SRAM), but the present invention is not limited thereto.

In an embodiment, the memory device 100 may be a portable memory device (e.g. a memory card conforming to the SD/MMC, CF, MS, XD specifications), and the host device 130 may be an electronic device connectable to the memory device 100, such as a smartphone, laptop computer, desktop computer, and so on. In another embodiment, the memory device 100 may be a solid state drive (SSD) or a storage device that conforms to the Universal Flash Storage (UFS) or Embedded Multi Media Card (EMMC) specification that is installed in an electronic device, such as a smartphone, laptop computer, desktop computer and so on, while the host device 130 may be a processor of the electronic device.

Figure 2:
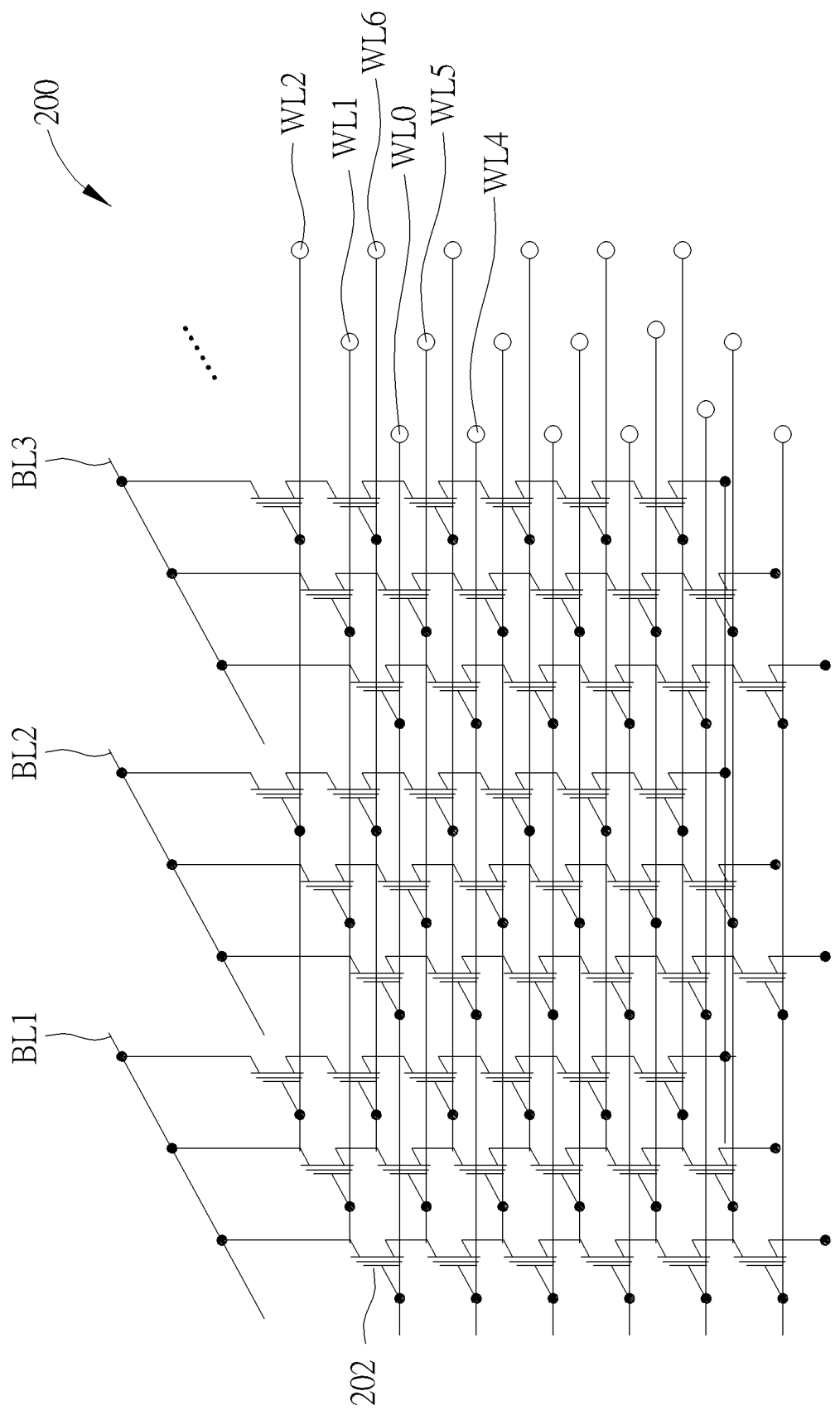
FIG. 2 is a diagram illustrating a block in a flash memory according to an embodiment of the present invention.

FIG. 2 is a diagram illustrating a block 200 in the flash memory module 120 according to an embodiment of the present invention, wherein the flash memory module 120 may be a 3D NAND-TYPE flash memory. As shown in FIG. 2, the block 200 comprises multiple memory units (e.g. the floating-gate transistor 202 or other charge trap element), which form the 3D NAND-TYPE flash memory mechanism via multiple bit lines (e.g. the bit lines BL1-BL3 shown in the figure, but the present invention is not limited thereto) and word lines (e.g. the word lines WL0-WL2, WL4-WL6 shown in the figure). Take the uppermost plane in in FIG. 2 as example, all floating-gate transistors on the word line WL0 form at least one page, all floating-gate transistors on the word line WL1 format least another page, and all floating-gate transistors on the word line WL2 further form yet at least another page, and so on. Further, due to different writing manners of the flash memory, the definition of the relationship between the word line WL0 and pages (i.e. logical pages) will also be different. Specifically, when writing with the single-level cell (Single-Level Cell, SLC) technique, all floating-gate transistors on the word line WL0 are only corresponding to one single logical page; when writing with the Multi-Level Cells (MLC), all floating-gate transistors on the word line WL0 are corresponding to two logical pages; when writing with the Triple-Level Cell (TLC) technique, all floating-gate transistors on the word line WL0 are corresponding to three logical pages; and when writing with the Quad-Level Cell (QLC) technique, all floating-gate transistors on the word line WL0 are corresponding to four logical pages. Since one skilled in the art should be readily to understand the structure of the 3D NAND-TYPE flash memory and the relationship between word lines and pages, the detailed descriptions are omitted here for brevity.

Figure 3:
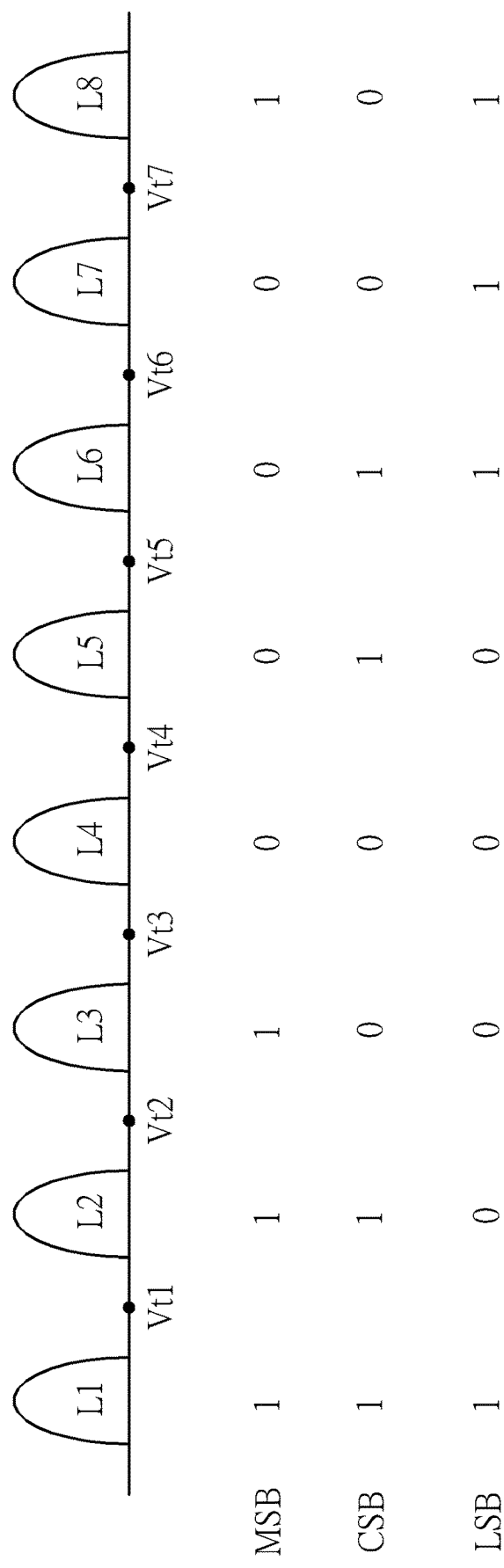
FIG. 3 is a diagram illustrating multiple writing voltage levels and multiple threshold voltages in a page.

FIG. 3 is a diagram illustrating multiple writing voltage levels L1-L8 and multiple threshold voltages Vt1-Vt7 when using triple-level cell (TLC) as the block 200. As shown in FIG. 3, each floating-gate transistor 202 may be programmed to have the voltage level L1 (i.e. (MSB, CSB, LSB)=(1, 1, 1)), the voltage level L2 (i.e. (MSB, CSB, LSB)=(1, 1, 0), the voltage level L3 (i.e. (MSB, CSB, LSB)=(1, 0, 0), the voltage level L4 (i.e. (MSB, CSB, LSB)=(0, 0, 0), the voltage level L5 (i.e. (MSB, CSB, LSB)=(0, 1, 0), the voltage level L6 (i.e. (MSB, CSB, LSB)=(0, 1, 1), the voltage level L7 (i.e. (MSB, CSB, LSB)=(0, 0, 1) or the voltage level L8 (i.e. (MSB, CSB, LSB)=(1, 0, 1)). When the memory controller 110 needs to read the least significant bit (LSB) in the floating-gate transistor 202, the flash memory controller 110 will use the reading voltages Vt1 and Vt5 to read the floating gate memory 202, and refer to the conduction state of the floating gate memory 202 (e.g. if any current is generated or not) to generate "1" or "0". Similarly, when the flash memory controller 110 needs to read the Center significant bit (CSB), the flash memory controller 110 will use the reading voltages Vt2, Vt4 and Vt6 to read the floating gate memory 202, and refer to the conduction state of the floating gate memory 202 (e.g. if any current is generated) to generate "1" or "0", for the decoder 134 to perform decoding. Similarly, when the flash memory controller 110 needs to read the most significant bit (MSB) in the floating gate memory 202, the flash memory controller 110 will use the reading voltages Vt3 and Vt7 to read the floating gate memory 202, refer to the conduction state of the floating gate memory 202 (e.g. if any current is generated or not) to determine whether the MSB is "1" or "0", for the decoder 134 to perform decoding. In this embodiment, when the floating gate memory 202 has the voltage level L1, it can be called as having an erase state, and when the floating gate memory 202 had any of the voltage levels L2-L8, it can be called as having a programming state.

It should be noted that the example shown in FIG. 3 is merely for illustrating the process of the flash memory controller reading the floating gate memory 202, and the implementation manner is not meant to limit the scope of the present invention. Specifically, the aforementioned LSB, CSB and LSB may be encoded in different manners, and the flash memory controller may further use additional auxiliary voltages to read the floating gate memory 202 in order to provide more information for the decoder 134 to perform decoding. In addition, since one skilled in the art should be readily to realize how to apply the aforementioned embodiment to SLC, MLC and QLC blocks after reading the contents associated with FIG. 3, the details thereof are omitted here for brevity.

Since the flash memory module 120 may cause shifting of the writing voltage levels L1-L8 due to data retention, writing states, environmental factors, etc., which makes the original reading voltages Vt1-Vt7 unable to correctly read the flash memory module 120. Hence, the manufacturer of the flash memory module 120 usually provides a read-retry table 142 which records multiple read-setting levels. Each of the read-setting levels corresponds to at least one reading voltages, and the reading voltages of any two of the read-setting levels are not entirely the same. The flash memory controller 110 may load the read-retry table 142 into the buffer memory 116 during booting, to control the flash memory module 120 to use different reading voltages Vt1-Vt7 to read the flash memory module 120 in order to obtain the data with higher quality that can be successfully decoded. Specifically, the example shown in FIG. 3 is illustrated as follows. Since each of the word lines of a TLC block comprises three logical pages that are generally called as the Least Significant Bit (LSB) page, Center Significant Bit (CSB) page and Most Significant Bit (MSB) page). Hence, the read-retry table 142 may comprises three sub-tables, wherein the first sub-table comprises multiple read-setting levels corresponding to the LSB page, the second sub-table comprises multiple read-setting levels corresponding to the CSB page, and the third sub-table comprises multiple read-setting levels corresponding to the MSB page. Take the first sub-table as example, the first read-setting level may be the reading voltages Vt1 and Vt5, the second read-setting level may be the reading voltages Vt1+Δ and Vt5+Δ, the third read-setting level may be the reading voltages Vt1−Δ and Vt5−Δ, the fourth read-setting level may be the reading voltages Vt1+2*Δ and Vt5+2*Δ, the fifth read-setting level may be the reading voltages Vt1−2*Δ, Vt5−2*Δ, . . . , and so on, wherein Δ may be any value much smaller than the distance between two reading voltages.

As shown in the related art techniques, since the read-retry table 142 comprises many read-setting levels, when the flash memory module causes the shifting of the writing voltage levels L1-L8 due to being under a severe environment (e.g. extremely high or extremely low temperature) or due to other factors, using the related art technique that sequentially reads the flash memory module 120 with read-setting levels usually takes many attempts of using ineffective read-setting levels before finding a suitable read-setting level to successfully read data. In addition, by using multiple read-setting levels under various environments to read multiple sets of data generated by the flash memory module 120, the inventor counts and concludes that many read-setting levels in fact cannot generate suitable data with a lower bit error quantity/bit error rate. Aiming to solve the above problem, the present invention particularly proposes establishing a read-success recording table 144 in the buffer memory 116 which records at least one specific read-setting level that has been previously used to successfully read the flash memory module. When the flash memory controller 110 needs to change the read-setting level to read the flash memory module 120, use of the specific read-setting level recorded in the read-success recording table 144 may be prioritized, making the flash memory controller 110 find the suitable read-setting level more quickly to improve the system efficiency.

Figure 4:
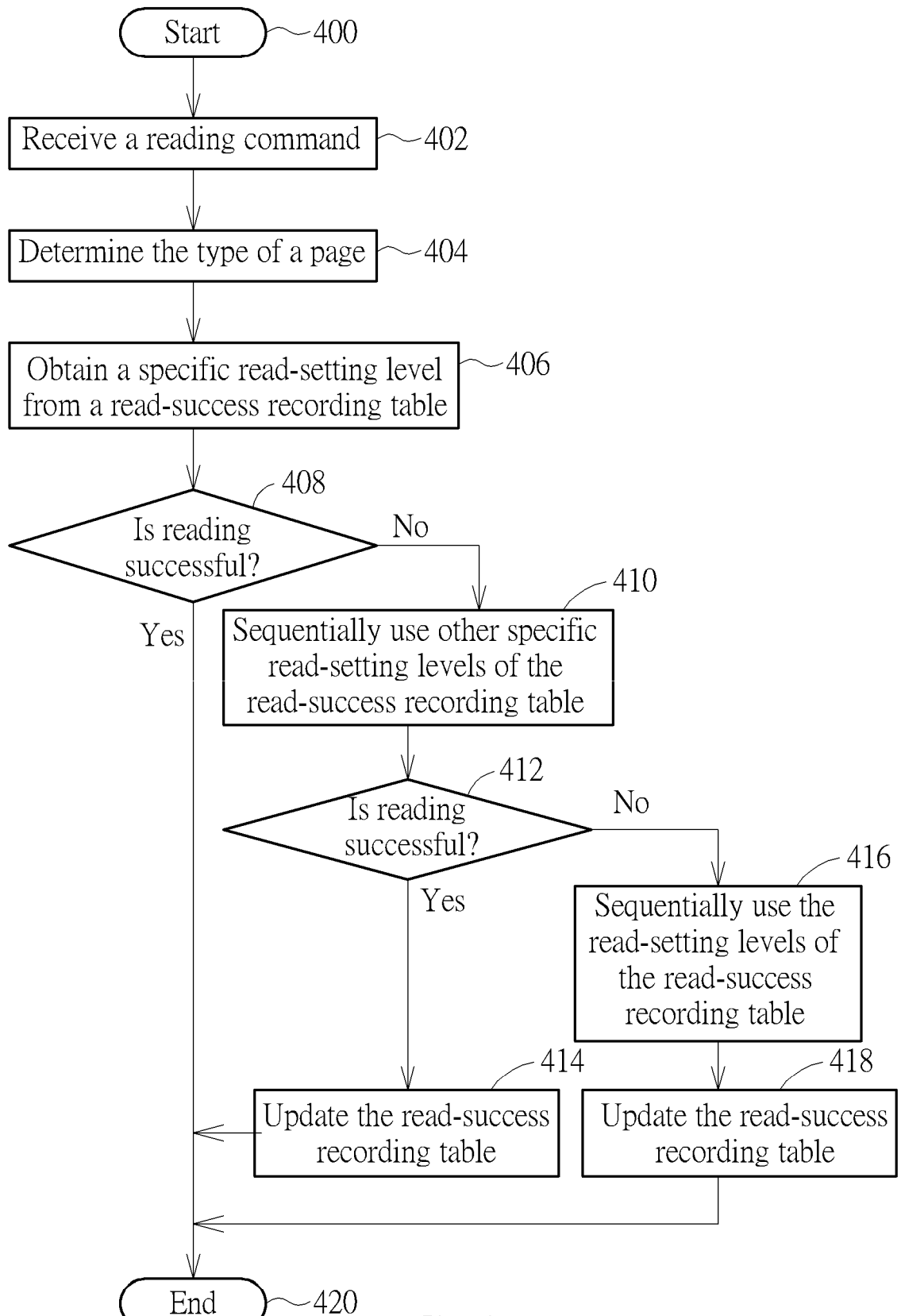
FIG. 4 is a flowchart illustrating a method of accessing a flash memory module according to an embodiment of the present invention.

FIG. 4 is a flowchart illustrating a method of accessing a flash memory module 120 according to an embodiment of the present invention. The flow begins at Step 400, and later in Step 402, the flash memory controller 110 receives a reading command from the host device 130 in order to request reading data from at least one page within the flash memory module 120. To have better comprehension of the technical contents of the present embodiment, assuming that the reading command requests reading data from a specific page of a block within the flash memory module 120. In Step 404, the microprocessor 112 determines the type of the specific page. Using TLC blocks for example, the microprocessor 112 may determine that the specific page belongs to one of a LSB page, CSB page and MSB page. In Step 406, the microprocessor 112 obtains a specific read-setting level from the read-success recording table 144. Specifically, the microprocessor 112 may refer to the type of the specific page to obtain a sub-table of the read-success recording table 144, and select a specific read-setting level with the highest priority within the sub-table. For example, assuming that the read-success recording table 144 has four fields with priorities ranging sequentially from high to low, and each of the fields records the specific read-setting level that is previously used to successfully read the specific read-setting level of the flash memory module 120. In addition, the four fields of the read-success recording table 144 respectively record the fourth read-setting level RSL4, the eighth read-setting level RSL8, the tenth read-setting level RSL10 and the thirteenth read-setting level RSL13. An example of the read-success recording table 144 is shown as the following Table A:

TABLE A

| First field | Second field | Third field | Fourth field |
| --- | --- | --- | --- |
| RSL4 | RSL8 | RSL10 | RSL13 |

In Step 408, the microprocessor 112 uses the fourth read-setting level RSL4 with the highest priority among the above four read-setting levels to read the specific page within the flash memory module 120. If the reading is successful (i.e., the decoder 134 may successfully decode the read-in data), the flow goes to Step 420; and if the reading fails (i.e., the decoder 134 is unable to decode the read-in data due to there are too may bit errors in the read-in data), the flow goes to Step 410. In Step 410, the microprocessor 112 refers to the read-success recording table 144 (e.g. Table A) to sequentially use the eighth read-setting level RSL8, the tenth read-setting level RSL10 and the thirteenth read-setting level RSL13 to read the specific page within the flash memory module 120. Step 412 determines whether the specific page can be successfully read or not. If the microprocessor 112 can successfully read the specific page via using any of the eighth read-setting level RSL8, the tenth read-setting level RSL10, the thirteenth read-setting level RSL13, the flow goes to Step 414; and if the microprocessor 112 cannot successfully read the specific page via using any of the eighth read-setting level RSL8, the tenth read-setting level RSL10, the thirteenth read-setting level RSL13, the flow goes to Step 416.

In Step 414, the microprocessor 112 refers to the specific read-setting level for successfully reading the specific page to update the read-success recording table 144, to arrange the specific read-setting level that successfully reads the specific page to the first field (i.e. granting it with the highest priority). For example, assuming that the microprocessor 112 uses the eighth read-setting level RSL8 to successfully read the specific page, the read-success recording table 144 is updated as the following Table B:

TABLE B

| First field | Second field | Third field | Fourth field |
|---|---|---|---|
| RSL8 | RSL4 | RSL10 | RSL13 |

Assuming the microprocessor 112 uses the tenth read-setting level RSL10 to successfully read the specific page, the read-success recording table 144 will be updated as the following Table C:

TABLE C

| First field | Second field | Third field | Fourth field |
|---|---|---|---|
| RSL10 | RSL4 | RSL8 | RSL13 |

Assuming the microprocessor 112 uses the thirteenth read-setting level RSL13 to successfully read the specific page, the read-success recording table 144 will be updated as the following Table D:

TABLE D

| First field | Second field | Third field | Fourth field |
|---|---|---|---|
| RSL13 | RSL4 | RSL8 | RSL10 |

In Step 416, the microprocessor 112 sequentially uses multiple read-setting levels recorded in the read-retry table 142 to read the specific page. Once the microprocessor 112 successfully reads the specific page, the microprocessor 112 prevents using remaining read-setting levels to read the specific page. For example, assuming that there are read-setting levels RSL1-RSL50 in the read-retry table 142, the microprocessor 112 may sequentially use the first read-setting level RSL1, the second read-setting level RSL2, . . . , to read the specific page, until there are already many read-setting levels that successfully read the specific page. In Step 418, the microprocessor 112 refers to the read-setting levels that successfully read the specific page to update the read-success recording table 144, to arrange the read-setting levels that successfully read the specific page to the first field (i.e. granting them with the highest priority). For example, assuming that the microprocessor 112 uses the thirtieth read-setting level RSL30 to successfully read the specific page (while the thirty first read-setting level RSL31 and the follow-up read-setting levels are not used), the read-success recording table 144 is updated as the following Table E (the earliest recorded thirteenth read-setting level RSL13 is deleted):

TABLE E

| First field | Second field | Third field | Fourth field |
|---|---|---|---|
| RSL30 | RSL4 | RSL8 | RSL10 |

In Step 420, the microprocessor 112 sends the data that is successfully read from the specific page to the host device 130, to terminate the reading operation.

In the embodiment shown in FIG. 4, via directly using specific read-setting levels recorded in the read-success recording table 144, the microprocessor 112 may be allowed to try from the read-setting level with the highest reading success rate rather than sequentially trying all read-setting levels within the read-retry table 142, in order to accelerate the reading speed of the flash memory module 120. In addition, since the read-success recording table 144 will use read-setting levels that are recently used to successfully read the flash memory module 120 to perform update, to accommodate the newest change, i.e. the environmental changes or the state changes of the electronic device 100.

Figure 5:
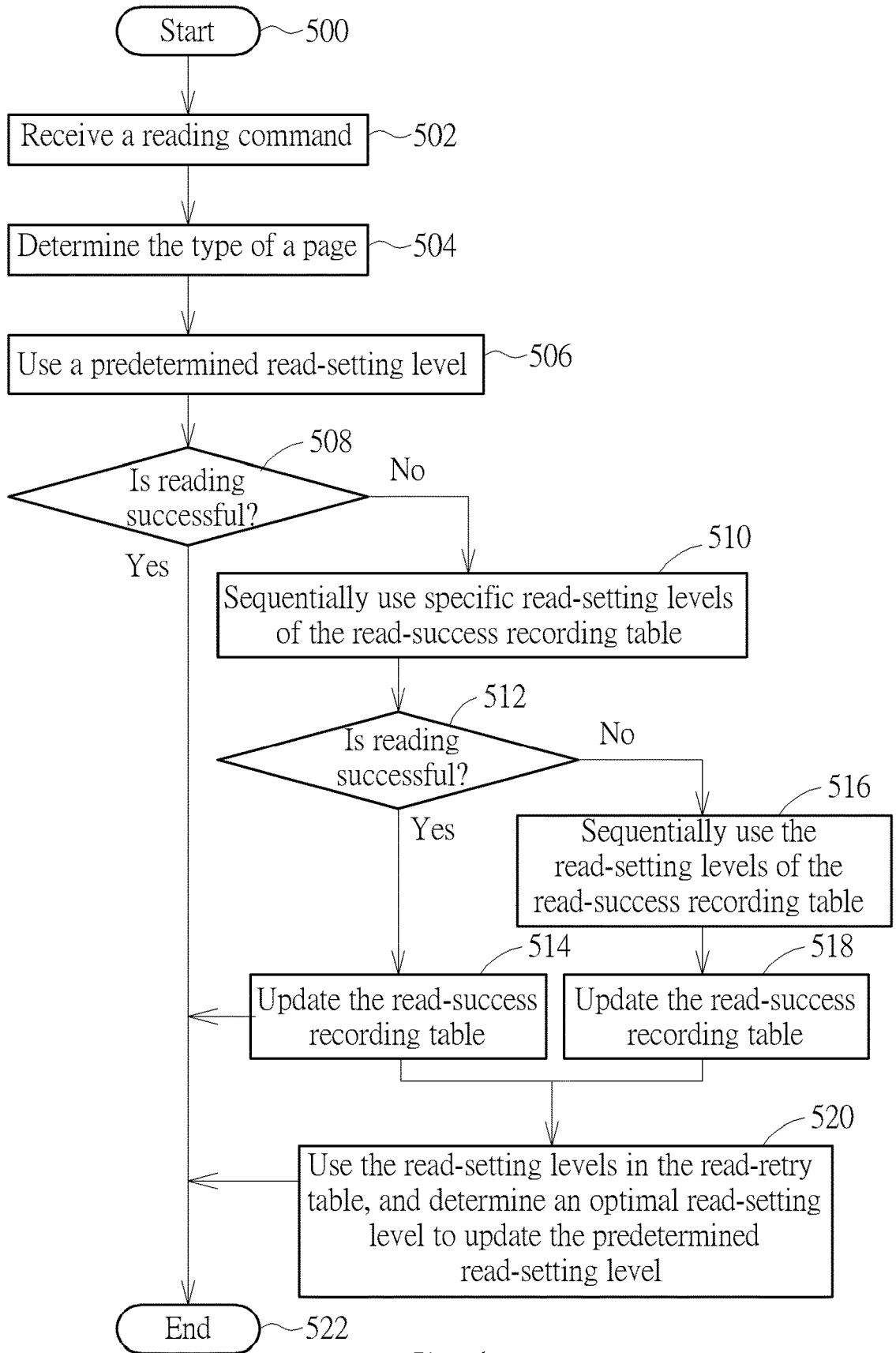
FIG. 5 is a flowchart illustrating a method of accessing a flash memory module according to another embodiment of the present invention.

FIG. 5 is a flowchart illustrating a method of accessing a flash memory module 120 according to another embodiment of the present invention. The flow begins at Step 500, and later in Step 502, the flash memory controller 110 receives a reading command from the host device 130 in order to request reading the data with at least one page read from the flash memory module 120. To have better comprehension of the present invention, it is assumed in the following illustration that the reading command requests reading a specific page (logical page) of a block within the flash memory module 120. In Step 504, the microprocessor 112 determines the type of the specific page. Using TLC blocks for illustration, the microprocessor 112 determines the specific page as belonging one of an LSB page, CSB page and MSB page. In Step 506, the microprocessor 112 uses a predetermined read-setting level, wherein the predetermined read-setting level may be predetermined read-setting levels corresponding to the lowest or lower bit error quantity/bit error rate, and the predetermined read-setting level may be modified with the operations of the electronic device 100. In Step 508, the microprocessor 112 uses the predetermined read-setting level to read the specific page in the flash memory module 120, and if the reading is successful (i.e., the decoder 134 can successfully decode the read-in data), the flow goes to Step 522; and if the reading fails (i.e., the decoder 134 is unable to complete decoding because there are too many bit errors in the data to be read), the flow goes to Step 510. In Step 510, the microprocessor 112 refers to the read-success recording table 144 (e.g. Table A) to sequentially use the fourth read-setting level RSL4, the eighth read-setting level RSL8, the tenth read-setting level RSL10 or the thirteenth read-setting level RSL13 to read the specific page in the flash memory module 120. Step 512 determines whether the specific page can be successfully read. If the microprocessor 112 may successfully read the specific page via using any of the fourth read-setting level RSL4, the eighth read-setting level RSL8, the tenth read-setting level RSL10, the thirteenth read-setting level RSL13, the flow goes to Step 514. If the microprocessor 112 is unable to successfully read the specific page via using any of the fourth read-setting level RSL4, the eighth read-setting level RSL8, the tenth read-setting level RSL10 and the thirteenth read-setting level RSL13, the flow goes to Step 516.

In Step 514, the microprocessor 112 refers to the specific read-setting levels that successfully read the specific page to update the read-success recording table 144, in order to arrange the specific read-setting level that successfully read the specific page to the first field (i.e. granting them with the highest priority). For example, assuming that the microprocessor 112 uses the fourth read-setting level RSL4 to successfully read the specific page, the read-success recording table 144 only needs to maintain the contents of Table A rather than performing update. In another example, assuming that the microprocessor 112 successfully reads the specific page via using the eighth read-setting level RSL8, the tenth read-setting level RSL10 or the thirteenth read-setting level RSL13, the above Table B—Table D can be examples of the updated read-success recording table 144. In Step 516, the microprocessor 112 sequentially reads the specific page via using multiple read-setting levels recorded in the read-retry table 142. Once the microprocessor 112 successfully reads the specific page, the microprocessor 112 prevents using the remaining read-setting levels to read the specific page. In Step 518, the microprocessor 112 refers to the read-setting levels that successfully read the specific page to update the read-success recording table 144, in order to arrange the read-setting levels that successfully read the specific page to the first field (i.e. granting them with the highest priority), such as Table E mentioned above.

In Step 520, the microprocessor 112 again respectively uses multiple read-setting levels in the read-retry table 142 to read the flash memory module 120 in order to obtain multiple sets of data, the decoder 134 performs decoding on the sets of data to determine the bit error quantity of each sets of data, and the microprocessor 112 sets the read-setting level corresponding to the set of data having the smallest bit error quantity as the predetermined read-setting level, to be used in the next reading operation. Specifically, assuming that there are 50 read-setting levels RSL1-RSL50 in the read-retry table 142, the microprocessor 112 may sequentially use the read-setting levels RSL1-RSL50 to read at least a portion of data content of the specific page to obtain 50 sets of data. Assuming that the data obtained via using the read-setting level RSL40 to read the specific page has the smallest bit error quantity/bit error rate, the microprocessor 112 may set the read-setting level RSL40 as the predetermined read-setting level. Hence, when the flash memory controller 110 receives a reading command from the host device 130 next time, Step 506 can be initiated to directly use the read-setting level RSL40 to read the flash memory module 120.

In Step 522, the microprocessor 112 sends the data successfully read from the specific page to the host device 130, in order to terminate the reading operation.

In the embodiment shown in FIG. 5, by preferentially using the predetermined read-setting level previously corresponding to the smallest bit error quantity/bit error rate to read the flash memory module 120, the read-in data is more likely to have a lower bit error quantity/bit error rate in order to prevent the processing speed of the LDPC circuit in the decoder 134 to from becoming too fast or too slow due to the extremely high bit error quantity/bit error rate. In addition, by using the specific read-setting level recorded in the read-success recording table 144, the microprocessor 112 may perform reading via preferentially using a read-setting level that is more likely to contribute to a successful reading rather than sequentially trying all read-setting levels in the read-retry table 142, thereby finding the read-setting level that can be successfully read more effectively and more quickly in order to accelerate the reading speed of the flash memory module 120. In addition, the read-success recording table 144 may use recent read-setting levels that successfully read the flash memory module 120 to perform update, thereby able to accommodate the latest change of the electronic device 100.

Figure 6:
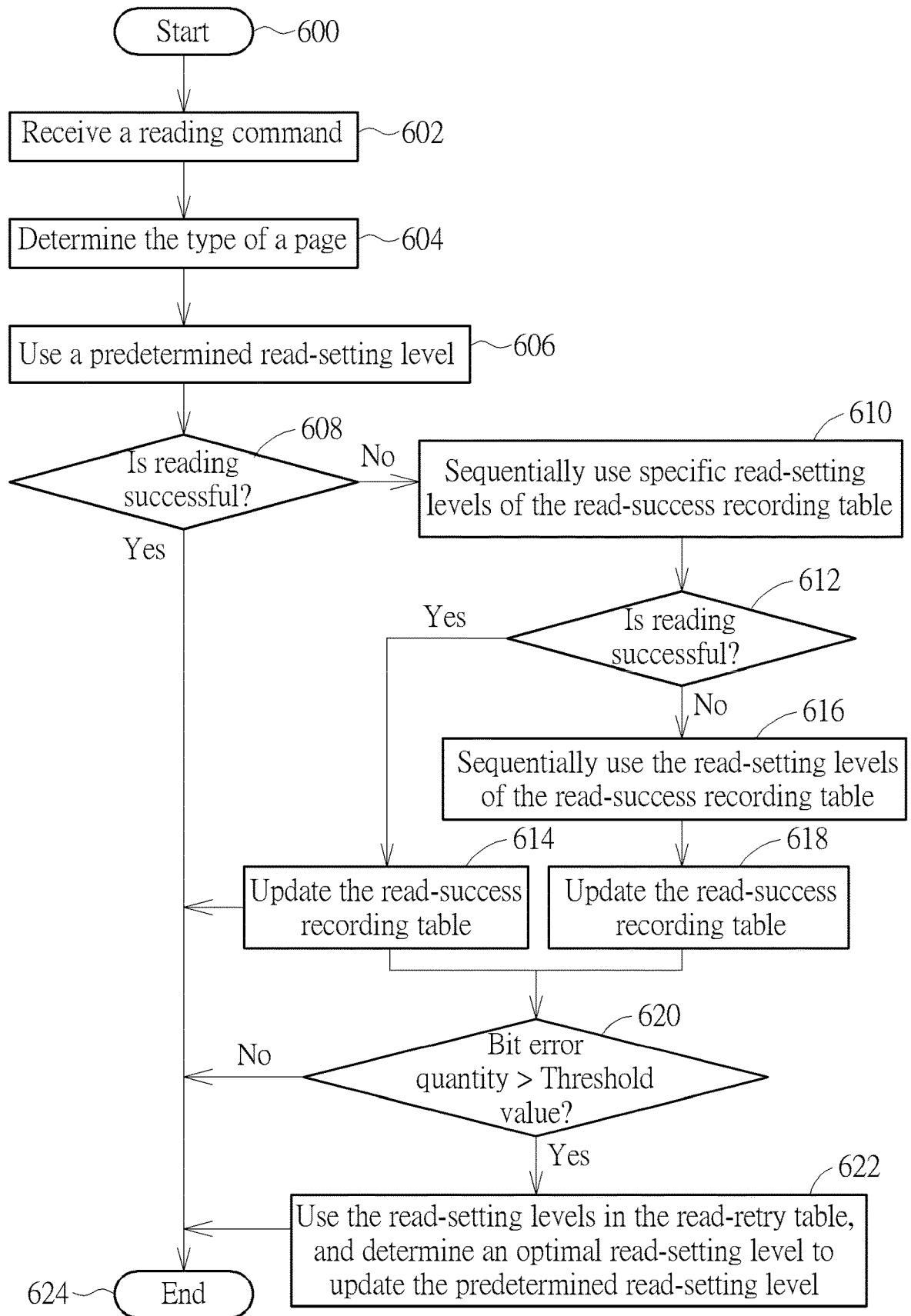
FIG. 6 is a flowchart illustrating a method of accessing a flash memory module according to another embodiment of the present invention.

FIG. 6 is a flowchart illustrating a method of accessing a flash memory module 120 according to another embodiment of the present invention. Since the contents in Steps 600-618 of FIG. 6 are identical to Steps 500-518 of FIG. 5 respectively, the following descriptions starts from Step 620. In Step 620, after the microprocessor 112 successfully reads the flash memory module 120, the microprocessor 112 determines whether the bit error quantity/bit error rate of the data successfully read from the flash memory module 120 is higher than a threshold value. If the bit error quantity/bit error rate is higher than the threshold value, the flow goes to Step 622; and if the bit error quantity/bit error rate is not higher than the threshold value, the flow goes to Step 624. Step 622 is similar to Step 520 of FIG. 5, i.e. the microprocessor 112 again respectively uses multiple read-setting levels in the read-retry table 142 to read the flash memory module 120 in order to obtain multiple sets of data, the decoder 134 performs decoding upon the sets of data to determine the bit error quantity of each sets of data, and the microprocessor 112 sets the read-setting level corresponding to the set of data with the smallest bit error quantity as the predetermined read-setting level to be used in the next reading operations. In Step 624, the microprocessor 112 sends the data successfully read from the specific page to the host device 130, in order to terminate the reading operation.

In FIG. 6, since the way Step 622 sequentially uses all read-setting levels in the read-retry table 142 to read the flash memory module 120 may consume more time, the present embodiment provides a determining mechanism in Step 620 that makes Step 622 only be executed when the bit error quantity/bit error rate is too high, in order to prevent a long execution process.

To briefly summarize, the present invention provides a method of accessing a flash memory module, and associated flash memory controller and electronic device, which can accelerate the process of finding suitable read-setting levels by establishing a read-success recording table and continuously updating the read-success recording table according to the operations performed upon the electronic device, thereby avoiding the problem encountered in related art techniques that too much time is wasted on finding suitable read-setting levels. Therefore, the present invention can significantly improve the system efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, wherein the flash memory controller is arranged to access a flash memory module, the flash memory module comprises at least one flash memory chip, each of the at least one flash memory chip comprises multiple blocks, each of the blocks comprises multiple pages, and the flash memory controller comprises:
   a read-only memory (ROM), arranged to store a code;
   a microprocessor, arranged to execute the code to control accessing of the flash memory module; and
   a buffer memory, arranged to store a read-retry table and a read-success recording table, wherein the read-retry table records multiple read-setting levels, each of the read-setting levels is corresponding to at least one reading voltage, and reading voltages of any two read-setting levels among the read-setting levels are not entirely the same; and the read-success recording table records at least one specific read-setting level that has been previously used to successfully read the flash memory module;
   wherein when the microprocessor needs to read the flash memory module, the microprocessor reads the flash memory module according to the at least one specific read-setting level recorded in the read-success recording table;

wherein the read-success recording table records multiple specific read-setting levels that have been previously used to successfully read the flash memory module; and when the microprocessor needs to read the flash memory module, the microprocessor directly uses a first specific read-setting level among the specific read-setting levels to read the flash memory module, and later when the microprocessor fails to read the flash memory module via using the first specific read-setting level, the microprocessor directly uses a second specific read-setting level among the specific read-setting levels to read the flash memory module.

2. The flash memory controller of claim 1, wherein when the microprocessor fails to successfully read the flash memory module via using any of the at least one specific read-setting level, the microprocessor sequentially uses at least a portion of the read-setting levels recorded in the read-retry table to read the flash memory module; and when the microprocessor successfully reads the flash memory module, the microprocessor updates the read-success recording table to record the currently used read-setting level into the read-success recording table.

3. The flash memory controller of claim 1, wherein when the microprocessor fails to successfully read the flash memory module via using any of the at least one specific read-setting level, the microprocessor sequentially uses at least a portion of the read-setting levels recorded in the read-retry table to read the flash memory module; and when the microprocessor successfully reads the flash memory module, the microprocessor updates the read-success recording table to record the currently used read-setting level into the read-success recording table.

4. The flash memory controller of claim 1, wherein if the microprocessor successfully reads the flash memory module via using the second specific read-setting level, the microprocessor adjusts the priority the read-success recording table records the specific read-setting levels, to make the second specific read-setting level rank ahead the first specific read-setting level in priority.

5. The flash memory controller of claim 4, wherein when the microprocessor fails to successfully read the flash memory module via using any of the at least one specific read-setting level, the microprocessor sequentially uses at least a portion of the read-setting levels recorded in the read-retry table to read the flash memory module; and when the microprocessor successfully reads the flash memory module, the microprocessor updates the read-success recording table to record the currently used read-setting level into the read-success recording table.

6. The flash memory controller of claim 4, wherein if the microprocessor successfully reads the flash memory module via using the second specific read-setting level, the microprocessor adjusts the read-success recording table to make the second specific read-setting level have the highest priority; and when the microprocessor needs to read the flash memory module again, the microprocessor directly uses the second specific read-setting level to read the flash memory module.

7. The flash memory controller of claim 6, wherein when the microprocessor fails to successfully read the flash memory module via using any of the at least one specific read-setting level, the microprocessor sequentially uses at least a portion of the read-setting levels recorded in the read-retry table to read the flash memory module; and when the microprocessor successfully reads the flash memory module, the microprocessor updates the read-success recording table to record the currently used read-setting level into the read-success recording table.

8. The flash memory controller of claim 6, wherein when the microprocessor fails to successfully read the flash memory module via using any of the at least one specific read-setting level, the microprocessor sequentially uses the read-setting levels recorded in the read-retry table to read the flash memory module, and once the microprocessor successfully reads the flash memory module, the microprocessor prevents using remaining read-setting levels to read the flash memory module.

9. The flash memory controller of claim 6, wherein when the microprocessor successfully reads the flash memory module, the microprocessor updates the read-success recording table to delete the earliest recorded specific read-setting level, and records the currently used read-setting level into the read-success recording table, to serve as the latest specific read-setting level.

10. The flash memory controller of claim 1, wherein the read-success recording table comprises multiple sub-tables, each of the sub-tables corresponds to a different type of block and different logical pages, and each of the sub-table records at least one specific read-setting level.

11. A flash memory controller, wherein the flash memory controller is arranged to access a flash memory module, the flash memory module comprises at least one flash memory chip, each of the at least one flash memory chip comprises multiple blocks, each of the blocks comprises multiple pages, and the flash memory controller comprises:
    a read-only memory (ROM), arranged to store a code;
    a microprocessor, arranged to execute the code to control accessing of the flash memory module; and
    a buffer memory, arranged to store a read-retry table and a read-success recording table, wherein the read-retry table records multiple read-setting levels, each of the read-setting levels is corresponding to at least one reading voltage, and reading voltages of any two read-setting levels among the read-setting levels are not entirely the same; and the read-success recording table records at least one specific read-setting level that has been previously used to successfully read the flash memory module;
    wherein when the microprocessor needs to read the flash memory module, the microprocessor reads the flash memory module according to the at least one specific read-setting level recorded in the read-success recording table;
    wherein when the microprocessor needs to read the flash memory module, the microprocessor uses a predetermined read-setting level to read the flash memory module, and later when the microprocessor fails to read the flash memory module via using the predetermined read-setting level, the microprocessor directly reads the flash memory module according to the at least one specific read-setting level recorded in the read-success recording table;
    wherein when the microprocessor fails to read the flash memory module via using any of the at least one specific read-setting level, the microprocessor sequentially uses at least a portion of the read-setting levels recorded in the read-retry table to read the flash memory module; and when the microprocessor successfully reads the flash memory module, the microprocessor updates the read-success recording table to record the currently used read-setting level into the read-success recording table.

12. The flash memory controller of claim 11, wherein after the microprocessor successfully reads the flash memory module, the microprocessor again respectively uses the read-setting levels in the read-retry table to read the flash memory module to obtain and decode multiple sets of data, in order to determine the bit error rate for each of the sets of data; and the microprocessor sets the read-setting level corresponding to one of the sets of data that has the lowest bit error rate as the predetermined read-setting level.

13. The flash memory controller of claim 11, wherein after the microprocessor successfully reads the flash memory module, the microprocessor determines whether the bit error quantity or bit error rate upon successfully reading the flash memory module is higher than a threshold value or not; if the bit error quantity or bit error rate is higher than the threshold value, the microprocessor again respectively uses the read-setting levels in the read-retry table to read the flash memory module in order to obtain and decode multiple sets of data, in order to determine the bit error quantity for each of the sets of data; and the microprocessor sets the read-setting level corresponding to one of the sets of data that has the smallest bit error quantity as the predetermined read-setting level.

14. The flash memory controller of claim 11, wherein when the microprocessor fails to successfully read the flash memory module via using any of the at least one specific read-setting level, the microprocessor sequentially uses the read-setting levels recorded in the read-retry table to read the flash memory module, and once the microprocessor successfully reads the flash memory module, the microprocessor prevents using remaining read-setting levels to read the flash memory module.

15. The flash memory controller of claim 14, wherein after the microprocessor successfully reads the flash memory module, the microprocessor again respectively uses the read-setting levels in the read-retry table to read the flash memory module to obtain and decode multiple sets of data, in order to determine the bit error rate for each of the sets of data; and the microprocessor sets the read-setting level corresponding to one of the sets of data that has the lowest bit error rate as the predetermined read-setting level.

16. The flash memory controller of claim 14, wherein after the microprocessor successfully reads the flash memory module, the microprocessor determines whether the bit error quantity or bit error rate upon successfully reading the flash memory module is higher than a threshold value or not; if the bit error quantity or bit error rate is higher than the threshold value, the microprocessor again respectively uses the read-setting levels in the read-retry table to read the flash memory module in order to obtain and decode multiple sets of data, in order to determine the bit error quantity for each of the sets of data; and the microprocessor sets the read-setting level corresponding to one of the sets of data that has the smallest bit error quantity as the predetermined read-setting level.

17. The flash memory controller of claim 11, wherein when the microprocessor successfully reads the flash memory module, the microprocessor updates the read-success recording table to delete the earliest recorded specific read-setting level, and records the currently used read-setting level into the read-success recording table, to serve as the newest specific read-setting level.

18. The flash memory controller of claim 17, wherein after the microprocessor successfully reads the flash memory module, the microprocessor again respectively uses the read-setting levels in the read-retry table to read the flash memory module to obtain and decode multiple sets of data, in order to determine the bit error rate for each of the sets of data; and the microprocessor sets the read-setting level corresponding to one of the sets of data that has the lowest bit error rate as the predetermined read-setting level.

19. The flash memory controller of claim 17, wherein after the microprocessor successfully reads the flash memory module, the microprocessor determines whether the bit error quantity or bit error rate upon successfully reading the flash memory module is higher than a threshold value or not; if the bit error quantity or bit error rate is higher than the threshold value, the microprocessor again respectively uses the read-setting levels in the read-retry table to read the flash memory module in order to obtain and decode multiple sets of data, in order to determine the bit error quantity for each of the sets of data; and the microprocessor sets the read-setting level corresponding to one of the sets of data that has the smallest bit error quantity as the predetermined read-setting level.

20. A method of accessing a flash memory module, wherein the flash memory module comprises at least one flash memory chip, each of the at least one flash memory chip comprises multiple blocks, each of the blocks comprises multiple pages, and the method comprises:
    providing a read-retry table, wherein the read-retry table records multiple read-setting levels, each of the read-setting levels corresponds to at least one reading voltage, and reading voltages of any two of the read-setting levels are not entirely the same;
    establishing a read-success recording table, which records at least one specific read-setting level that has been previously used to successfully read the flash memory module; and
    when there is a need to read the flash memory module, using the at least one specific read-setting level recorded in the read-success recording table to read the flash memory module;
    wherein the read-success recording table records multiple specific read-setting levels that have been previously used to successfully read the flash memory module, and the method comprises:
    when there is a need to read the flash memory module, directly using a first specific read-setting level among the specific read-setting levels to read the flash memory module; and
    when the first specific read-setting level fails to read the flash memory module, directly using a second specific read-setting level among the specific read-setting levels to read the flash memory module.

21. The method of claim 20, further comprising:
    when the flash memory module cannot be successfully read via using any of the at least one specific read-setting level, sequentially using at least a portion of the read-setting levels recorded in the read-retry table to read the flash memory module; and
    when the flash memory module is successfully read, updating the read-success recording table to record the currently used read-setting level into the read-success recording table.

22. An electronic device, comprising:
    a flash memory module; and
    a flash memory controller, arranged to access the flash memory module, wherein the flash memory controller stores a read-retry table, the read-retry table records multiple read-setting levels, each of the read-setting levels corresponds to at least one reading voltage, and reading voltages of any two of the read-setting levels are not entirely the same;

wherein the flash memory controller further establishes a read-success recording table, wherein the read-success recording table records at least one specific read-setting level that has been previously used to successfully read the flash memory module; and when the flash memory controller needs to read the flash memory module, the flash memory controller reads the flash memory module according to the at least one specific read-setting level recorded in the read-success recording table;

wherein the read-success recording table records multiple specific read-setting levels that have been previously used to successfully read the flash memory module; and when the flash memory controller needs to read the flash memory module, the flash memory controller directly uses a first specific read-setting level among the specific read-setting levels to read the flash memory module, and later when the flash memory controller fails to read the flash memory module via using the first specific read-setting level, the flash memory controller directly uses a second specific read-setting level among the specific read-setting levels to read the flash memory module.

23. The electronic device of claim 22, wherein when the flash memory controller fails to successfully read the flash memory module via using any of the at least one specific read-setting level, the flash memory controller sequentially uses at least a portion of the read-setting levels recorded in the read-retry table to read the flash memory module; and when the flash memory controller successfully reads the flash memory module, the flash memory controller updates the read-success recording table in order to record the currently used read-setting level into the read-success recording table.

* * * * *